US008513903B2

(12) United States Patent
Horikawa et al.

(10) Patent No.: US 8,513,903 B2
(45) Date of Patent: Aug. 20, 2013

(54) DISCHARGE LAMP LIGHTING DEVICE

(75) Inventors: Takumi Horikawa, Tokyo (JP); Kikuro Sasayama, Tokyo (JP); Kenichi Kitagawa, Nagano (JP)

(73) Assignees: TDK-Lambda Corporation, Tokyo (JP); Seiko Epson Corporation, Tokyo (JP)

( * ) Notice: Subject to any disclaimer, the term of this patent is extended or adjusted under 35 U.S.C. 154(b) by 263 days.

(21) Appl. No.: 13/015,811

(22) Filed: Jan. 28, 2011

(65) Prior Publication Data

US 2011/0187288 A1    Aug. 4, 2011

(30) Foreign Application Priority Data

Jan. 29, 2010    (JP) .................. 2010-019715

(51) Int. Cl.
*H05B 41/36*    (2006.01)
(52) U.S. Cl.
USPC ........ 315/307; 315/209 R; 315/224; 315/226; 315/291; 315/DIG. 7
(58) Field of Classification Search
USPC ............ 315/209 R, 224, 226, 291, 307, 308, 315/DIG. 5, DIG. 7
See application file for complete search history.

(56) References Cited

U.S. PATENT DOCUMENTS

| 4,912,374 | A  | * | 3/1990  | Nagase et al. ................ 315/244 |
| 6,324,078 | B1 | * | 11/2001 | Naruo et al. ..................... 363/17 |
| 6,426,597 | B2 | * | 7/2002  | Rast et al. ...................... 315/219 |
| 7,141,937 | B2 | * | 11/2006 | Kumagai et al. ............... 315/224 |
| 7,211,970 | B2 | * | 5/2007  | Takahashi et al. ............. 315/360 |
| 2008/0192210 | A1 | * | 8/2008  | Ushiyama ....................... 353/85 |
| 2011/0012525 | A1 | * | 1/2011  | Terashima .................... 315/246 |

FOREIGN PATENT DOCUMENTS

| JP | 6-111984 A    | 4/1994  |
| JP | 2000-195692 A | 7/2000  |
| JP | 2002-93590 A  | 3/2002  |
| JP | 2004-303501 A | 10/2004 |
| JP | 2005-044812 A | 2/2005  |
| JP | 2006-513539 A | 4/2006  |
| JP | 2007-214010 A | 8/2007  |
| JP | 2009-110681 A | 5/2009  |
| JP | 2010-003440 A | 1/2010  |
| JP | 2010-010074 A | 1/2010  |

* cited by examiner

*Primary Examiner* — Douglas W Owens
*Assistant Examiner* — Thai Pham
(74) *Attorney, Agent, or Firm* — McDermott Will & Emery LLP (57) ABSTRACT

A discharge lamp lighting device capable of preventing magnetic saturation of an inductor connected with an output of an inverter. An inverter 12 comprises a first set of switching elements 32, 33 for switching an output voltage of the inverter 12 to a positive polarity and a second set of switching elements 31, 34 for switching the output voltage thereof to a negative polarity. At the start-up of a lamp 20, each of the switching elements 31 to 34 is allowed to perform switching operations in such a pattern that after turning on and off the first set of the switching elements 32, 33 more than once, the second set of switching elements 31, 34 are allowed to turn or and off more than once. Accordingly, energy stored in the inductor 37 is discharged during a temporary off-period, thus permitting the inductor 37 to be prevented from being magnetically saturated.

10 Claims, 9 Drawing Sheets

DISCHARGE LAMP LIGHTING DEVICE

CROSS REFERENCE TO RELATED APPLICATIONS

The present application claims priority under 35 U.S.C. §119 to Japanese Patent Application No. 2010-019715, filed Jan. 29, 2010, which is incorporated herein by reference.

BACKGROUND OF THE INVENTION

1. Field of the Invention

The present invention relates to a discharge lamp lighting device for supplying a starting waveform required at the start-up of a discharge lamp to the discharge lamp and a technique for causing the reduced loss to the device.

2. Description of the Related Art

Recently, a start-up voltage for lighting a lamp at its lighting start-up has become low owing to the development in technique for a lamp as a discharge lamp. As a result, a waveform required in the discharge lamp lighting device at its start-up has undergone changes.

Conventional discharge lamps needed a high voltage as high as around 15 kV at the lighting start-up and hence a discharge lamp lighting device also needed to be designed, accordingly. By encapsulating krypton or the like inside a discharge lamp, however, a voltage required for the lighting start-up has decreased to around 3 to 5 kV. Further, a discharge lamp lighting device capable of continuously generating a pulse voltage around 1 to 2 kV has been required in order to meet new needs.

In association with such a decrease in lighting start-up voltage of a discharge lamp, the conventional lighting devices have met the above-mentioned needs by applying and developing the conventional high-frequency start-up system. Specifically, as disclosed, in Japanese patent publication No. 2006-513539 (International publication No. WO2004/064457), with the conventional circuit system unchanged, the frequency of an inverter at the lighting start-up is allowed to sequentially change and a resonant frequency is mixed into variations in properties of circuit parts to temporarily obtain a desired pulse voltage, or otherwise, a new circuit is added to the original one to realize the desired pulse voltage.

According to any of the conventional arts proposed in the above publication, etc., it is possible to obtain a desired pulse voltage matching the discharge lamp. However, because an inverter is allowed to operate at such high frequencies as on the order of 70 to 200 kHz, there have been concerns about an increase in internal loss of the discharge lamp lighting device and an inner generation of an unexpected high voltage and/or high current.

Further, whilst an inductor for applying a high voltage pulse to a discharge lamp at the lighting start-up is connected with an output of the inverter, there is a concern that such inductor for applying the high voltage pulse may be magnetically saturated depending on the operational timing of switching elements making up the inverter.

Therefore, with the view of the above problems, it is an object of the present invention to provide a discharge lamp lighting device in which an inductor connected with an output of an inverter can be prevented from being magnetically saturated and besides its internal loss can be reduced to a minimum without adding any parts.

SUMMARY OF THE INVENTION

To attain the above object, a discharge lamp lighting device according to the present invention comprises a DC power circuit for regulating an input voltage matching a tube voltage of a discharge lamp, an inverter for converting a DC output power from the DC power circuit into an AC power to supply the AC current to the discharge lamp, a control circuit for controlling the DC power circuit and the inverter, and an inductor connected with an output of the inverter to apply high voltage pulse across electrodes of the discharge lamp at the lightning start-up of the discharge lamp. The inverter comprises a first set of switching elements for switching an output voltage of the inverter to a voltage with one polarity and a second set of switching elements for switching the output voltage to a voltage with the other polarity. Each of the above switching elements is allowed to perform switching operations in such a single or recurring pattern that after turning on and off the first set of switching elements more that once, the second set of switching elements are allowed to turn on and off more than once.

Further, a timing to turn on one set of said switching elements other than the other set of said switching elements turned on last is set in a range of 0 to 180 degrees in a period of a resonant frequency determined by a component of said inductor connected with the output of said inverter, a component determined by capacitances of a diode included in each of said switching elements and its peripheral circuit and an input voltage of said inverter, with a time at which all of said switching elements begin to turn off last defined as 0 degree, while a timing to turn on again the set of said switching elements equal to the other set of said switching elements turned on last is set in a range of 180 to 360 degrees in the period of said resonant frequency, with a time at which all of said switching elements begin to turn off last defined as 0 degree.

In this case, it is desirable that the control circuit allows each of the switching elements to operate in a recurring pattern such that the first set of the switching elements turn on, and then, all the above switching elements turn off, and then, the first set of the switching elements turn on again, and then, all the above switching elements turn off, and then, the second set of the switching elements turn on, and then, all the above switching elements turn off, and then, the second set of the switching elements turn on, and then, all the above switching elements turn off.

According to the present invention, when the first set or second set of the switching elements turns on, energy is stored in the inductor connected with an output of the inverter and thereafter the same set of the switching elements turns off to remain in the off-state temporarily and then turns on again. Hence, the energy stored in the inductor is discharged during this off-state, thus giving rise to no magnetic saturation of the inductor. Accordingly, by optimizing the operational timings of the switching elements making up the inverter, the inductor connected with the output of the inverter can be prevented from being magnetically saturated.

Further, according to the present invention, each of the switching elements is allowed to turn on in such a timing as determined by taking into consideration the component of the inductor connected with the output of the inverter, the component determined by capacitances of the diode included in each of the switching elements and its peripheral circuit, and the input voltage of the inverter, thus eliminating the need for flowing high current for charging or discharging capacitive component contained in each of the switching elements. Therefore, by optimizing the operational timings of the switching elements making up the inverter, the internal loss can be reduced to a minimum without bothering to add any parts.

Furthermore, according to the present invention, even if the number of switching times is the same as the conventional ones, the number of switching times to change the polarity of the output voltage of the inverter is reduced by half. Hence, the internal loss of the discharge lamp lighting device can be reduced by half as a whole.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Next is a description of a preferred embodiment of the present invention with reference to the accompanying drawings.

Figure 1:
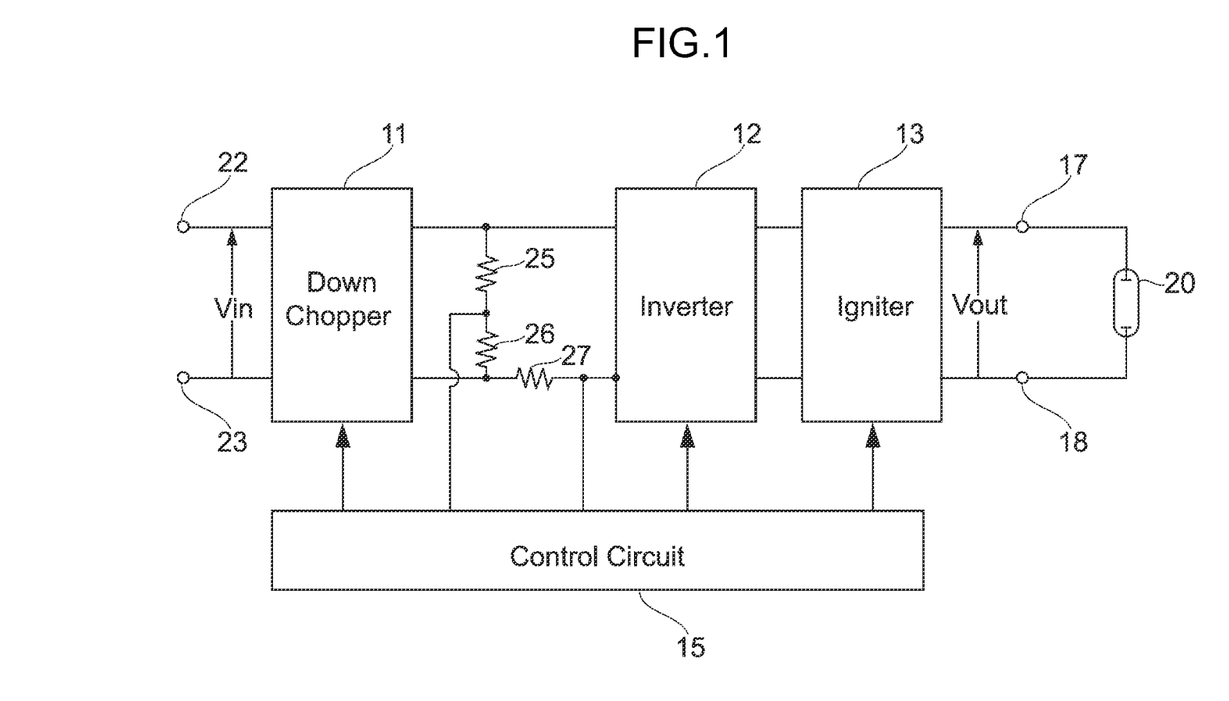
FIG. 1 is a block diagram illustrating a configuration of a discharge lamp lighting device according to one embodiment of the present invention.

In FIG. 1, a discharge lamp lighting device according to the present embodiment comprises a down chopper 11, an inverter 12, an igniter 13 and a control circuit 15. A lamp 20, serving as a discharge lamp, is connected with output terminals 17, 18 that are connected with the igniter 13. The down chopper 11 corresponds to a DC power circuit according to the present invention, aimed at regulating a DC input voltage Vin applied across input terminals 22, 23 for the sake of supplying a given constant voltage matching a tube voltage of the lamp 20. In this embodiment, the input voltage Vin is allowed to drop by a chopper process to perform current control for supplying a constant electric power to the lamp 20. An output current of the down chopper 11 is output to the inverter 12.

A series circuit comprising resistors 25, 26 is connected across output terminals of the down chopper 11. A potential generated at a node between the resistors 25, 26 is supplied to the control circuit 15 as an output voltage of the down chopper 11. Further, a resistor 27, serving as a current detector, is interposed between and is connected with a negative potential line of the down chopper 11. Then, a current flowing through the resistor 27 is detected as a lamp current to be supplied to the control circuit 15. The inverter 12 is made up of a plurality of switching elements, which are each allowed to perform a switching operation no that a DC voltage from the down chopper 11 is converted into an AC voltage to output the AC voltage to the igniter 13. The igniter 13, corresponding to a pulse generating circuit, is composed of, e.g., a trigger transformer, its driving circuit and the like, and generates a high-voltage pulse at the start-up where the lamp 20 is allowed to start lighting, thus allowing the igniter 13 to apply the high-voltage pulse from the trigger transformer to across electrodes of the lamp 20.

The control circuit 15 for controlling the down chopper 11, the inverter 12 and the igniter 13 is composed of a circuit including a microprocessor, for example. Here, the control circuit 15 takes in, e.g., an output voltage of the down chopper 11 and the lamp current to control the output current of the down chopper 11 for the sake of supplying a constant power to the lamp 20. Further, the control circuit 15 appropriately controls an output frequency of the inverter 12 and besides controls the igniter 13 at the start-up thereof to generate a high voltage.

Figure 2:
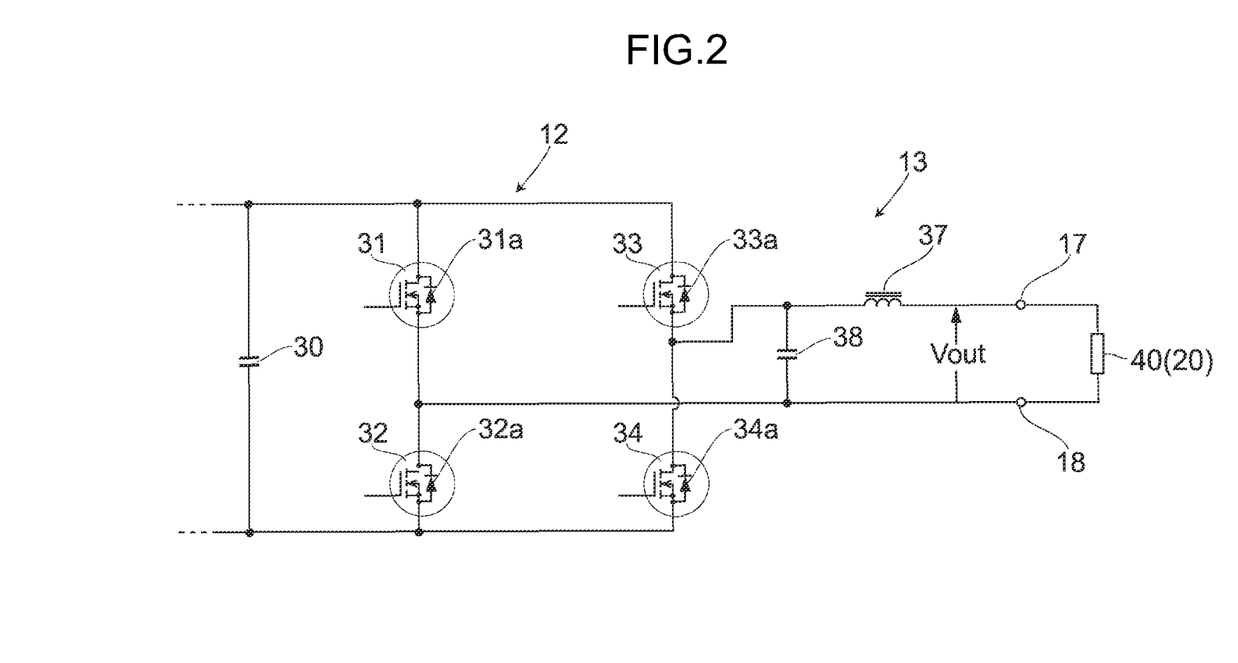
FIG. 2 is an equivalent circuit illustrating a partial configuration of an inverter and an igniter according to the above embodiment.

FIG. 2 shows an equivalent circuit of the inverter 12 and here shows a partial circuit configuration of the igniter 13, as well. In FIG. 2, the inverter 12 is composed of full-bridge-connected four switching elements 31 to 34. A first series circuit including a first switching element 31 and a second switching element 32, and a second series circuit including a third switching element 33 and a fourth switching element 34, in addition to an input capacitor 30, are connected across output terminals of the down chopper 11. Further, as a high voltage generating circuit of the igniter 13, an inverted L-type circuit comprising an inductor 37 corresponding to an inductive component of the trigger transformer and a capacitor 38 including a capacitor for noise canceling in generating a high voltage for a triggering operation is connected between output terminals of the inverter 12 and output terminals 17, 18 of the discharge lamp lighting device. As a result, it is configured such that one terminal of the inductor 37 and one terminal of the capacitor 38 are connected with a junction point of the switching elements 33 and 34, one electrode of the lamp 20 is connected with the other terminal of the inductor 37 via the output terminal 17, and the other terminal of the capacitor 38 and the other terminal of the lamp 20 are connected with a junction point of the switching elements 31 and 32.

The switching elements 31 to 34 making up the inverter 12 are N-channel MOSFETs each having identical characteristics, in which diodes 31a to 34a built in the switching elements 31 to 34 are connected in inverse parallel across the drains and sources of the MOSFETs. The diodes 31a to 34a each have such a characteristic that when these diodes 31a to 34a are in their on-states with a current flowing therethrough in the forward direction, they do not turn off unless a reverse current flows through the diodes. As a capacitive component for allowing the reverse current to continue to flow till each of the diodes 31a to 34a begins to turn off, there exists a reverse recovery electric charge amount for each diode. Note that the reverse recovery electric charge amount of each of the diodes 31a to 34a is sufficiently larger than the parasitic capacitance between drain and source in each of the switching elements 31 to 34. The reverse recovery electric charge amount referred to here is not only determined by the capacitive component of the diodes 31a to 34a built in the switching elements 31 to 34 but also by a capacitive component determined by capacitances of any elements connected with peripheral parts of the diodes 31a to 31a such as capacitances resulting from, e.g., an external capacitor connected across drain and source.

The control circuit 15 periodically and repeatedly produces on pulses of first drive signals applied to the gates of the switching elements 32, 33 at the start up and on pulses of second drive signals applied to the gates of the switching elements 31, 34 at the start-up, with both the on pulses not overlapping each other to allow a dead time therebetween. As a result, positive and negative output voltages Vout are applied across the lamp 20 from the inverter 12 via the igniter 13. Note that FIG. 2 shows an equivalent circuit at the time of the start-up of the lighting of the lamp 20. Here, assuming the lamp 20 is in a condition immediately after lighting, an equivalent load, e.g., a 30-volt constant voltage load 40 is connected across the output terminals 17, 18.

Next is a description of the behavior of the discharge lamp lighting device thus schemed.

At the start of lightening the lamp 20, the down chopper 11 drops an input DC voltage Vin by a chopping process to output the output current to the inverter 12. The inverter 12 converts a DC current from the down chopper 11 into an AC current with a given frequency by switching the switching elements 31 to 34 by means of the drive signal from the control circuit 15 to output the AC current to the igniter 13. Then, at the start-up, a high-voltage pulse is induced, in an inductor 37 equivalently shown as the trigger transformer making up the igniter 13. The igniter 13 superimposes the high-voltage pulse upon the AC voltage supplied from the inverter 12 to supply the resulting voltage to the lamp 20.

Thus, when the high-voltage pulse is applied to the lamp 20, the insulation breakdown occurs in the lamp 20 between its electrodes to start discharge. When the discharge is started, a current flows through the lamp 20 and then a suitable electric power is supplied from the inverter 12 via the igniter 13 to thereby allow the lamp 20 to start lighting. Afterwards, the control circuit 15 imports an output voltage of the down chopper 11 and a lamp current to control the down chopper 11 so as to supply constant electric power to the lamp 20.

Figure 3:
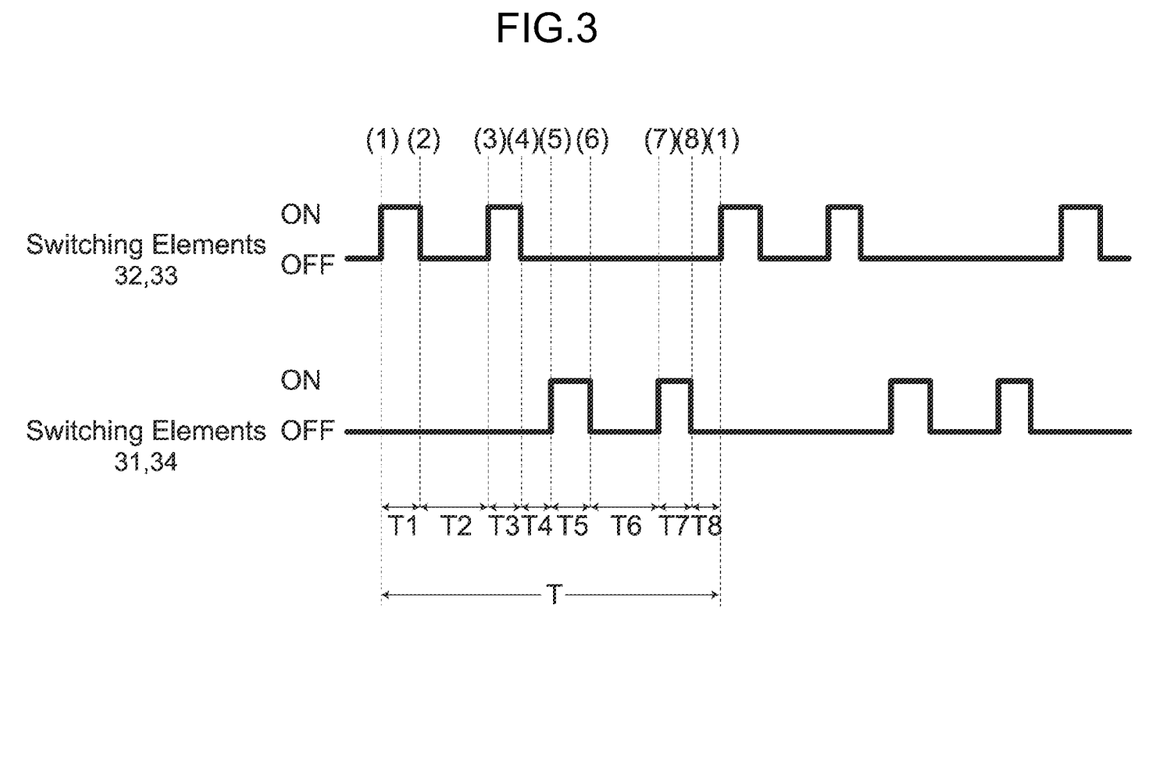
FIG. 3 shows timing charts illustrating an operating condition of respective switching elements in the above embodiment.

FIG. 3 shows timing charts indicating an operating condition of each of the switching elements 31 to 34 at the time of start-up. In FIG. 3, an operational timing indicating an operating condition of a first set of the switching elements 32,33 is shown in the upper chart, while that of a second set of the switching elements 31, 34 in the lower chart.

First, at the moment (1), a drive signal in the form of an on pulse is applied from the control circuit 15 to the gates of the switching elements 32, 33 to turn on these switching elements 32, 33. At this time, the inverter 12 outputs a voltage generated at the output terminals of the down chopper 11 directly to the igniter 13. Hence, a capacitor 38 is charged while a current flows from one terminal to the other terminal of the inductor 37 to store energy therein, and then the output current of the inverter 12 increases at a gradient determined by an inductance of the inductor 37. With reference to the other terminal of the load 40 connected with the Output terminal 18, a positive output voltage Vout is applied to one terminal of the load 40 connected with the output terminal 17.

Then, when time elapses to get to the moment (2) and the drive signal in the form of an on pulse applied from the control circuit 15 to the switching elements 32, 33 stops, all the switching elements 31 to 34 turn off. The time span from the moment (2) to the moment (3) at which the switching elements 32, 33 turn on again is provided to prevent the magnetic saturation of the inductor 37.

When the switching elements 31 to 34 turn off, the diodes 31a, 34a turn on due to the continuity of a current flowing through the inductor 37, thus a current flows from anodes to cathodes of the diodes 31a, 34a in the switching elements 31, 34. At this time, the output current of the inverter 12 decreases at a gradient determined by the inductance of the inductor 37. Also, a negative output voltage Vout is applied to one terminal of the load 40.

Subsequently, when all the energy stored in the inductor 37 is discharged and a current flowing from one terminal to the other terminal of the inductor 37 is reduced to zero, the current flowing through the inductor 37 is reversed in polarity. This reversed current gradually increases from zero with time and thus the inductor 37 stores energy again but the negative output voltage Vout is continuously applied to the one terminal of the load 40 with the voltage Vout unchanged in polarity. Further, the diodes 31a, 34a do not turn off immediately and hence a reverse current flows from the cathodes to the anodes of the diodes 31a, 34a.

Thus, when a certain period of time determined by the reverse recovery electric charge amount of the diodes 31a, 34a has elapsed and then the diodes 31a, 34a turn off, the diodes 32a, 33a turn on in turn and a current flows from the anodes to the cathodes of the diodes 32a, 33a in the switching elements 32, 33. As a result, the energy stored in the inductor 37 is discharged and thus the reverse current flowing through the inductor 37 makes the transition from increase to decrease and at the same time the voltage Vout applied to the one terminal of the load 40 is also subjected to reversal of polarity from negative to positive.

Thereafter, when time elapses to get to the moment (3), the drive signal in the form of an on pulse is applied from the control circuit 15 to the gates of the switching elements 32, 33 to turn on the switching elements 32, 33 again. At this time, a current is flowing through the diodes 32a, 33a in the switching elements 32, 33 and hence the switching elements 32, 33 are switched with the voltage substantially reduced to zero between drain and source. Consequently, the loss generated when the switching elements 32, 33 turn on can be reduced.

When the switching elements 32, 33 turn on again, the inverter 12 outputs the voltage generated across the output terminals of the down chopper 11 directly to the igniter 13. Hence, when the capacitor 38 is charged and all the energy stored in the inductor 37 is discharged, the current flowing through the inductor 37 is reversed to flow from one terminal to the other terminal of the inductor 37 and thus the inductor 37 stores energy again. This current increases at a gradient determined by the inductance of the inductor 37. Further, a positive voltage Vout is applied to the one terminal of the load 40.

Then, when time elapses to get to the moment (4), the drive signal in the form of an on pulse applied from the control circuit 15 to the switching elements 32, 33 stops, and then all the switching elements 31 to 34 turn off. The behavior subsequent to this turn-off operation is the same as that described in connection with the moment (2).

Then, when time elapses to get to the moment (5), the drive signal in the form of an on pulse is applied from the control circuit 15 to the gates of the switching elements 31, 34 to turn on the switching elements 31, 34. The time at which the switching elements 31, 34 turn on is specified as being within a period during which a current is flowing through the diodes 31a, 34a in the switching elements 31, 34, i.e., a period up until the current which flows from the one terminal to the other terminal of the inductor 37 is reduced to zero. As a result, with the voltage substantially reduced to zero between the drains and sources of the switching elements 31, 34, these switching elements 31, 34 can turn on, thereby making it possible to reduce the switching loss.

When the switching elements 31, 34 turn on, the inverter 12 reverses the polarity of the voltage generated at the output terminal of the down chopper 11 to output the reversed voltage to the igniter 13. Hence, when all the energy stored in the inductor 37 is discharged, the current flowing through the inductor 37 is reversed to flow from the other terminal to the one terminal of the inductor 37 and thus the inductor 37 stores energy again. This current increases at a gradient determined by the inductance of the inductor 37. Further, the capacitor 38 is charged with its polarity reversed and therefore a negative output voltage Vout is applied to the one terminal of the load 40.

In time, when time elapses to get to the moment (6), the drive signal in the form of an on pulse applied from the control circuit 15 to the switching elements 31, 34 stops, and then all the switching elements 31 to 34 turn off. A period from the moment (6) to a moment (7) at which the switching elements 32, 33 turn on again is provided to prevent the magnetic saturation of the inductor 37.

When the switching elements 31 to 34 turn off, due to the continuity of the current flowing through the inductor 37, the diodes 32a, 33a turn on to allow a current to flow from the anodes to the cathodes of the diodes 32a, 33a in the switching elements 32, 33. At this time, the output current of the inverter 12 decreases at a gradient determined by the inductance of the inductor 37. Besides, a positive output voltage Vout is applied to the one terminal of the load 40.

Thereafter, when all the energy stored in the indctor 37 is discharged and a current flowing from the other terminal to the one terminal of the inductor 37 is reduced to zero, the current flowing through the inductor 37 is reversed in polarity. The current flowing from the one terminal to the other terminal of the inductor 37 gradually increases from zero with time and the inductor 37 stores energy again. The positive output voltage Vout is continuously applied to the one terminal of the load 40 and is not reversed in polarity. At the same time, the diodes 32a, 33a do not turn off at once and a reversed current flows from the cathodes to the anodes of the diodes 32a, 33a.

Thus, when a certain period of time determined by the reverse recovery electric charge amount of the diodes 32a, 33a has elapsed and then the diodes 32a, 33a turn off, the diodes 31a, 34a turn on in turn to flow a current from the anodes to the cathodes of the diodes 31a, 34a in the switching elements 31, 34. As a result, the energy stored in the inductor 37 is discharged to allow a current flowing through the inductor 37 to make the transition from increase to decrease and at the same time the voltage Vout applied to the one terminal of the load 40 is also reversed in polarity from positive to negative.

Afterwards, when time elapses to get to the moment (7), the drive signal in the form of an on pulse is applied from the control circuit 15 to the gates of the switching elements 31, 34 to turn on the switching elements 31, 34 again. At this time, a current is flowing through the diodes 31a, 34a in the switching elements 31, 34 and hence the switching elements 31, 34 are switched with the voltage substantially reduced to zero between drain and source. Consequently, the loss generated when the switching elements 31, 34 turn on can be reduced.

When the switching elements 31, 34 turn on again, the inverter 12 reverses the voltage generated at the output terminal of the down chopper 11 to output the reversed voltage to the igniter 13. Hence, when all the energy stored in the inductor 37 is discharged, a current flowing through the inductor 37 is reversed to flow from the other terminal to the one terminal of the inductor 37 and then the inductor 37 stores energy again. This current increases at a gradient determined by the inductance of the inductor 37. Besides, the capacitor 38 is charged with its polarity reversed and therefore a negative output voltage Vout is applied to the one terminal of the load 40.

Then, when time elapses to get to the moment (8), the drive signal in the form of an on pulse applied from the control circuit 15 to the switching elements 31, 34 stops, and then all the switching elements 31 to 34 turn off. The behavior subsequent to this turn-off operation is the same as that described in connection with the moment (6).

Then, when time elapses to get to the moment (1) again, the drive signal in the form of an on pulse is applied from the control circuit 15 to the gate of the switching elements 32, 33 to turn on the switching elements 32, 33. The time at which the ic switching elements 32, 33 turn on is specified as being within a period during which a current is flowing through the diodes 32a, 33a in the switching elements 32, 33, i.e., a period up until the current flows from the other terminal to the one terminal of the inductor 37 is reduced to zero. As a result, the switching elements 32, 33 can turn on with the voltage substantially reduced to zero between the drains and the sources of the switching elements 32, 33, making it possible to reduce the switching loss. Afterward, the operations performed at the above moments (1) to (8) are repeated to alternately apply negative or positive voltage Vout to the lamp 40.

Figure 4:
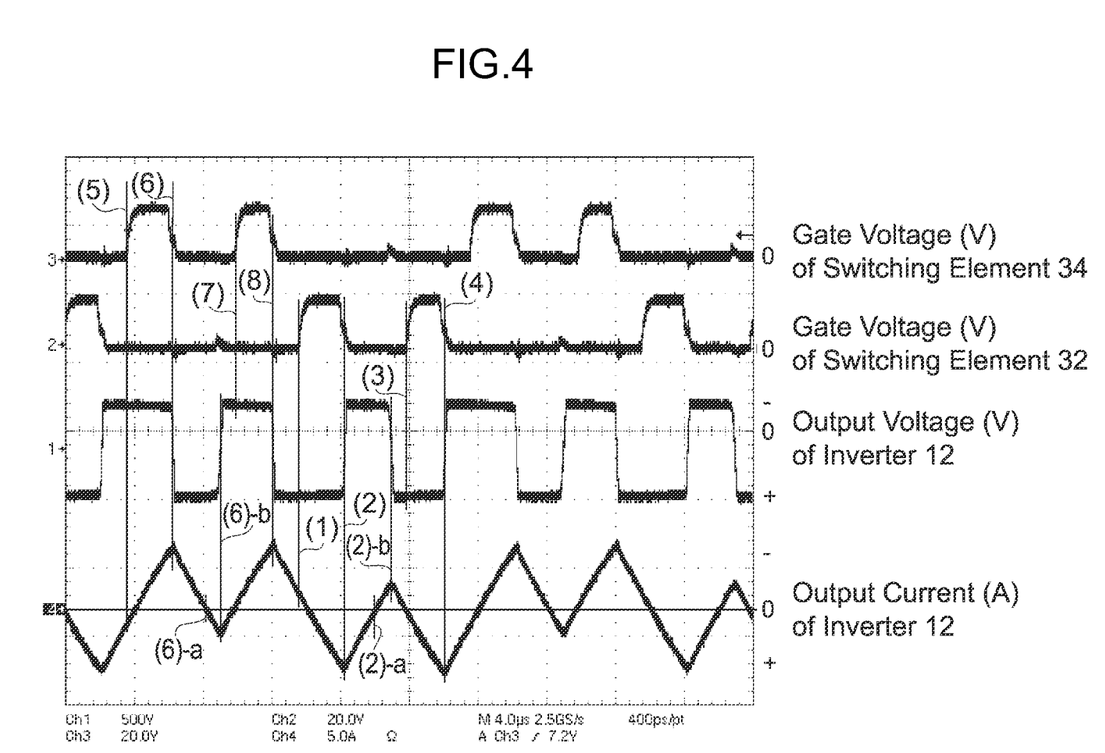
FIG. 4 shows waveform charts of respective parts each illustrating an operating condition in the above embodiment.

FIG. 4 shows a waveform in each part based on the above sequence of operations. In the drawing, a waveform at the top denotes the gate voltage of the switching element 34. Below, shown are a gate voltage of the switching element 32, the output voltage of the inverter 12 and the output current of the inverter 12, respectively. The output voltage and output current of the inverter 12, however, are reversed in polarity in relation to the polarities in the description of the behavior based on FIG. 3 shown as above.

First, at the moment (5), the control circuit 15 turns on the switching elements 31, 34. At this time, however, currents are flowing through the diodes 31a, 34a built in the switching elements 31, 34 and therefore the voltage between the drains and sources of the switching elements 31, 34 are in an substantially null state.

When time elapses to get to the moment (6), the control circuit 15 turns off the switching elements 31, 34. At the same time, the energy-stored inductor 37 acts as an electric power source for continuously flowing a current to the inverter 12 to turn on the diodes 32a, 33a in the switching elements 32, 33. Besides, an output polarity of the inverter 12 is reversed from negative (−) to positive (+).

Afterward, when time elapses to get to the moment (6)-a, the direction of the current is reversed by the inductor 37 to flow the reversed currents through the diodes 32a, 33a. As a result, the output voltage of the inverter 12 is unchanged in polarity, while the output current thereof is reversed from negative to positive.

Then, when time elapses to get to the moment (6)-b, the diodes 32a, 33a turn off, and then the inductor 37 supplies a current to turn on the diodes 31a, 34a. As a result, the output current of the inverter 12 makes the transition to decrease and the output polarity of the inverter 12 is reversed from positive to negative.

At the moment (7), the control circuit 15 turns on the switching elements 31, 34 again. At this time, currents are flowing through the diodes 31a, 34a built in the switching elements 31, 34, and therefore the voltages between the drains and the sources of the switching elements 31, 34 are in substantially null state.

Then, when time elapses to get to the moment (8), the control circuit 15 turns off the switching elements 31, 34. At the same time, the energy-stored inductor 37 acts as an electric power source for continuously flowing a current to the inverter 12 to turn on the diodes 32a, 33a. Besides, an output polarity of the inverter 12 is reversed from negative to positive.

Thereafter, at the moment (1), the control circuit 15 turns on the switching elements 32, 33. At this time, currents are flowing through the diodes 32a, 33a built in the switching elements 32, 33, and therefore the voltage between the drains and sources of the switching elements 32, 33 are in substantially null state.

The subsequent operations from the moment (1) to the moment (5) are the same as those at the moments (5) to (8) with both the output voltage and output current of the inverter 12 reversed in polarity.

In the above sequence of operations, the operation at the moment (7) is performed after the moment (6)-b to thereby enable the turn-on loss of the switching elements 31, 34 to be reduced. Note that the operations performed from the moment (6)-a to the moment (6)-b are based on the inductor 37, the reverse recovery electric charge amount of the diodes 32a, 33a, and the input voltage of the inverter 12, and therefore, the moment (7) is required to be set based on the periods of the operations.

As described above, at the start-up for causing the lamp 20 to light, the control circuit 15 allows the four switching elements 31 to 34 to perform switching operations in the specific pattern. At this time, a switching frequency is comparatively high (a range from 30 kHz to 100 kHz is preferable) and a switching period T shown in FIG. 3 is 20 µsec=50 kHz. According to the present embodiment, in particular, there are provided the first set of the switching elements 32, 33 for switching the output voltage of the inverter 12 to a voltage with one polarity at one terminal and the second set of the switching elements 31, 34 for switching the output voltage of the inverter 12 to a voltage with the other polarity at the other terminal. The control circuit 15 controls the operation of the inverter 12 in a recurring pattern such that the first set of the switching elements 32, 33 are allowed to turn on, all the switching elements 31 to 34 are allowed to turn off, the first set of the switching elements 32, 33 are allowed to turn on, all the switching elements 31 to 34 are allowed to turn off, the second set of the switching elements 31, 34 are allowed to turn on, all the switching elements 31 to 34 are allowed to turn off, the second set of the switching elements 31, 34 are allowed to turn on, and all the switching elements 31 to 34 are allowed to turn off, in sequence.

In FIG. 3, the period T1 from the moment (1) to the moment (2) is the same as the period T5 from the moment (5) to the moment (6) in length. According to the present embodiment, the period of each of T1, T5 is set at 2.3 µsec. The period T1 corresponds to a time duration during which the switching elements 32, 33 are in an on-state for the first time. The period T5 corresponds to a time duration during which the switching elements 31, 34 are in an on-state for the first time. The longer the periods T1, T5, the higher the output current of the inverter 12.

The period T2 from the moment (2) to the moment (3) and the period T6 from the moment (6) to the moment (7) are the same in length and are longer than the periods T1, T5. The period of each of T2, T6 is set at 4 µsec in the present embodiment. The period T2 or the period T6 corresponds to a dead time during which all the switching elements 31 to 34 are in an off-state until the same set of the switching elements 32, 33 or that of 31, 34 turn on again with the polarity of the inverter 12 unreversed. The longer the periods T2, T6, the more reliably the switching loss can be reduced when the switching elements 32, 33 or 31, 34 turn on next.

The period T3 from the moment (3) to the moment (4) and the period T7 from the moment (7) to the moment (8) are the same in length and are shorter than the periods T1, T5. According to the present embodiment, the period of each T3, T7 is set at 1.9 µsec. The period T3 corresponds to the time duration during which the switching elements 32, 33 are in an on-state for the second time and the period T7 corresponds to the time duration during which the switching elements 31, 34 are in an on-state for the second time. The longer the periods T3, T7, the larger the output current of the inverter 12.

The period T4 from the moment (4) to the moment (5) and the period T8 from the moment (8) to the moment (1) are the same in length and are shorter than the periods T2, T6 and also are shorter than the periods T3, T7. According to the present embodiment, the periods T4, T8 are set at 1.8 µsec. The period T4 corresponds to a dead time during which all the switching elements 31 to 34 are in an off-state until the set of the switching elements 31, 34, other than the set of the switching elements 32, 33 turned on last, turns on with the polarity of the inverter 12 reversed. The period T8 corresponds to a dead time during which all the switching elements 31 to 34 are in an off-state until the set of the switching elements 33, other than the set of the switching elements 31, 34 turned on last, turns on with the polarity of the inverter 12 reversed. The shorter the periods T4, T8, the more reliably the loss can be reduced when the switching elements 32, 33 or 31, 34 turn on next.

It should be noted that the above periods T1 to T8 can be easily changed by varying a software architecture of the control circuit 15 and therefore the preset time durations are not limited to those in the above embodiment. In order that the inductor 37 may not be excited in a biased manner, each of the periods T1 to T4 are set as the same as each of the periods T5 to T8, respectively in the present embodiment. These periods, however, need not always be the same as one another, and each of the switching elements 31 to 34 may be allowed to perform switching operations in a pattern other than the patterns shown in FIG. 3 and FIG. 4.

Figure 5A:
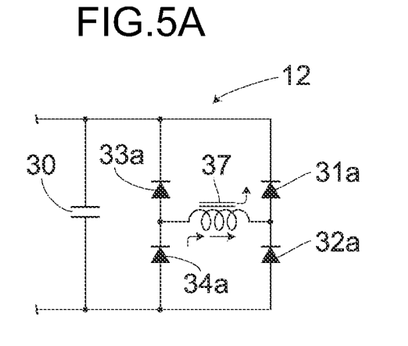
FIG. 5A to 5D are equivalent circuits illustrating operating conditions of the inverter when all the switching elements are allowed to be in an off-state in the above embodiment.
Figure 5B:
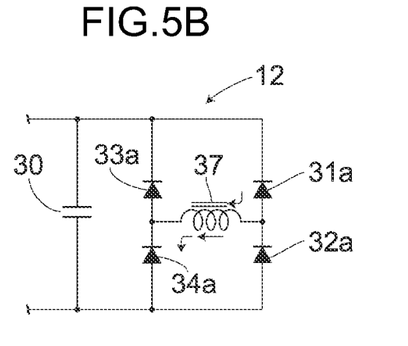
Figure 5C:
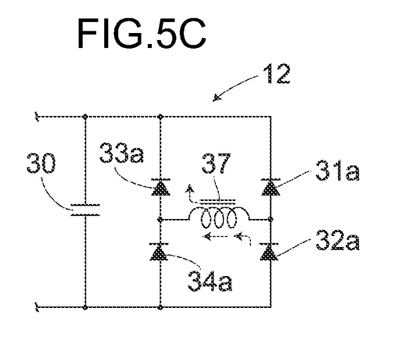
Figure 5D:
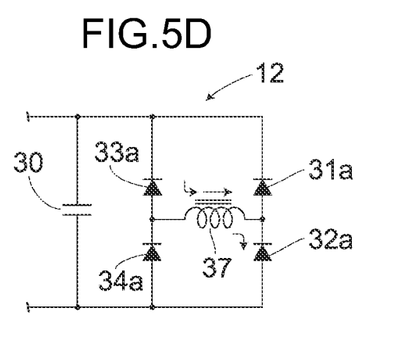
Figure 6:
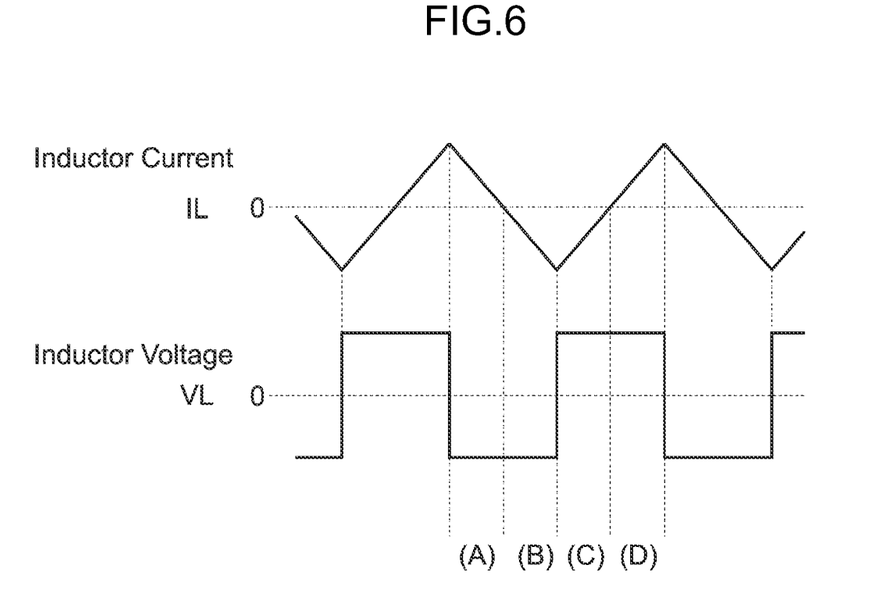
FIG. 6 shows waveform charts of an inductor current and an inductor voltage when all the switching elements are in an off-state in the above embodiment.

Next is a description, with reference to FIG. 5 and FIG. 6, of the behavior of the inverter 12 when all the switching elements 31 to 34 are allowed to turn off. FIG. 5A to 5D each show an equivalent circuit showing an operating condition of the inverter 12, while FIG. 6 shows a current IL (an inductor current) flowing through the inductor 37 and a voltage VL applied to the inductor 37.

In a period A, the diodes 32a, 33a turn off and thus the inductor 37 discharges energy to allow the inductor current IL to flow from the one terminal to the other terminal of the inductor 37, as shown in FIG. 5A. At this time, the diodes 31a, 34a turn on to flow a forward current and thus the inductor current IL linearly decreases. When the inductor 37 has discharged all the energy, the transition is made to a period B.

In the period B, the inductor 37 stores energy to flow the inductor current IL from the other terminal to the one terminal of the inductor 37, as shown in FIG. 5B. At this time, the diodes 31a, 34a continue to be in an on-state and thus a reverse current flows to linearly increase the inductor current IL. When the product of the length of the period B and the inductor current IL reaches the reverse recovery electric charge amount of the diodes 31a, 34a, the transition is made to the next period C.

In the period C, the diodes 31a, 34a turn off and thus the inductor 37 discharges energy to allow the inductor current IL to flow from the other terminal to the one terminal of the inductor 37, as shown in FIG. 5C. At this time, the diodes 32a, 33a turn on to flow the forward current and thus the inductor current IL linearly decreases. When the inductor 37 has discharged all the energy, the transition is made to a period D.

In the period D, the inductor 37 stores energy to flow the inductor current IL from the one terminal to the other terminal of the inductor 37, as shown in FIG. 5D. At this time, the diodes 32a, 33a continue to be in an on-state and thus a reverse current flows to linearly increase the inductor current IL. When the product of the length of the period D and the inductor current IL reaches the reverse recovery electric charge amount of the diodes 32a, 33a, the transition is made to the next period A.

In this fashion, the operations from the period A to the period D are repeated. At this time, a resonant frequency f attributable to the inductor 37 and the reverse recovery electric charge amount of the diodes 31a to 34a is expressed by the following formula.

$$f = \frac{1}{4}\sqrt{\frac{V}{2 \cdot Qrr \cdot L}} \quad \text{(Formula 1)}$$

where L denotes the inductance of the inductor 37, Qrr denotes the reverse recovery electric charge amount of the diodes 31a to 34a, and V denotes an input voltage of the inverter 12. Accordingly, both the moments (1), (3) at which the switching elements 32, 33 are allowed to turn on and the moments (5), (7) at which the switching elements 31, 34 are allowed to turn on may be set based on the resonant frequency f unambiguously determined by the inductance value L of the inductor 37, the reverse recovery electric charge amount Qrr of the diodes 31a to 34a built in the switching elements 31 to 34, and the input voltage V of the inverter 12.

The discharge lamp lighting device according to the present embodiment comprises the down chopper 11 serving as a DC power circuit for regulating the input voltage Vin matching the tube voltage of the lamp 20, the inverter 12 for converting the DC output from the down chopper 11 into an AC current power to supply the output current to the lamp 20, the control circuit 15 for controlling the down chopper 11 and the inverter 12, and the inductor 37 connected with the output of the inverter 12 to apply a high-voltage pulse across the electrodes of the lamp 20 at the start-up of the lamp 20. Then, the inverter 12 is desirably equipped with the four switching elements 31 to 34 comprising the first set of the switching elements 32, 33 for switching the output voltage of the inverter 12 to a voltage with a positive polarity and the second set of the switching elements 31, 34 for switching the output voltage of the inverter 12 to a voltage with a negative polarity. The control circuit 15 allows the switching elements 31 to 34 to perform the switching operation in a certain pattern at the start-up of the lamp 20.

Among the most important is the feature such that at the start-up of the lamp 20, each of the switching elements 31 to 34 is allowed to perform the switching operations, in such a pattern that after turning on and off the first set of the switching elements 32, 33 more than once, the second set of the switching elements 31, 34 is allowed to turn on and off more than once.

In this case, when the switching elements 32, 33 or the switching elements 31, 34 turn on, energy is stored in the inductor 37 connected with the output of the inverter 12. Thereafter, the same set of the switching elements 32, 33 or the same set of switching elements 31, 34, however, turns off to temporarily remain in an off-state and then turns on back again. Hence, during the period T2 or T6 in the temporal off-state, the energy stored in the inductor 37 is discharged, thus preventing the inductor 37 from being magnetically saturated. Accordingly, by optimizing, the operational timings of the switching elements 31 to 34 making up the inverter 12, the inductor 37 connected with the inverter 12 can be prevented from being magnetically saturated.

In addition, according to the present embodiment, the moment (5) and the moment (1) at which the set of the switching elements 31, 34 or the set of the switching elements 32, 33 other than the set of the witching elements 32, 33 or the set of the switching elements 31, 34 that was turned on at the last minute is set in the range of 0 to 180 degrees, with the moments (4) and the moment (8) at which all the switching elements 31 to 34 begin to turn off at the last minute defined as 0 degree, in the period of the resonant frequency unambiguously determined by the component of the inductor 37 connected with the output of the inverter 12, the component determined by the capacitances of the diodes 31a to 34a included in the switching elements 31 to 31 and peripheral circuit of the diodes, and the input voltage of the inverter 12. At the same time, the moments (3) and the moment (7) at which the set of the switching elements 31, 34 or the set of the switching elements 32, 33 which is the same as the set of the witching elements 32, 33 or the set of the switching elements 31, 34 that was turned on at the last minute is set in the range of 180 degree to 360 degrees, with the moments (2) and the moment (6) at which all the switching elements 31 to 34 begin to turn off last, defined as 0 degree, in the period of the resonant frequency.

This 180 degrees referred to herein means a moment corresponding to a half period of the resonant frequency and the moments (2)-b, (6)-b in FIG. 4 correspond to this. Also, 360 degrees means a moment corresponding to one period of the resonant frequency.

Thus, when turning on the switching elements 31 to 34 in such a timing as determined by considering the resonant frequency determined by the component of the inductor 37 connected with the inverter 12, the component determined by the capacitances of the diodes 31a to 34a included in the switching elements 31 to 34 and peripheral circuit of the diodes, and the input voltage of the inverter 12, no large current flows for charging and discharging the capacitive components contained in the switching elements 31 to 34. Accordingly, by optimizing the operational timing of the switching elements 31 to 34 making up the inverter 12, the inner loss can be reduced to a minimum without bothering to add any parts.

Preferably, with the moments (4), (8) defined as 0 degree, the moments (5), (1) may be set at 90±20 degrees (not less than 70 degrees and not more than 110 degrees) in the period of the resonant frequency, while with the moments (2), (6) defined as 0 degree, the moments (3), (7) may be set at 270±20 degrees (not less than 250 degrees and not more than 290 degrees) in the period of the resonant frequency. As a result, the operational timings of the switching elements 31 to 34 making up the inverter 12 can be optimized more reliably.

Furthermore, the control circuit 15 in the present embodiment may control the operation of the inverter 12 in a recurring pattern such that the first set of the switching elements 32, 33 turns on, then all the switching elements 31 to 34 turn off, then the first set of the switching elements 32, 33 turns on, and then all the switching elements 31 to 34 turn off, then the second set of the switching elements 31, 34 turns on, then all the switching elements 31 to 34 turn off then the second set of the switching elements 31, 34 turns on, and then all the switching elements 31 to 34 turn off.

In contrast, the conventional driving procedure of the inverter 12 at the start-up repeated the operation in which the first set of the switching elements 32, 33 is allowed to turn on, all the switching elements 31 to 31 are allowed to turn off, the second set of the switching elements 31, 34 is allowed to turn on, and all the switching elements 31 to 34 are allowed to turn off, in sequence. Here, the period in which all the switching elements 31 to 34 are allowed to be in an off-state is generally referred to as a dead time, during which a current flowing through the inverter 12 with the lamp 20 not lighted acts as charging and discharging currents of the capacitive element (of the capacitor 38) equivalently connected with the output of the inverter 12 and this current causes the internal loss of the discharge lamp lighting device.

Unlike the conventional procedure, in the discharge lamp lighting device according to the present embodiment, the control circuit 15 allows each of the switching elements 31 to 34 to perform the switching operation so that the pattern other than conventional one is repeated in which the first set of the switching elements 32, 33 turns on, all the switching elements 31 to 34 turn off, the first set of the switching elements 32, 33 turns on, all the switching elements 31 to 34 turn off, the second set of the switching elements 31, 34 turns on, all the switching elements 31 to 34 turn off, the second set of the switching elements 31, 34 turns on, and all the switching elements 31 to 34 turn off, in sequence. Accordingly, even if the same number of switching times is performed, the number of switching times for alternating the polarity of the output voltage of the inverter 12 is reduced by half. Hence, the internal loss of the discharge lamp lighting device can be reduced by half.

Figure 9:
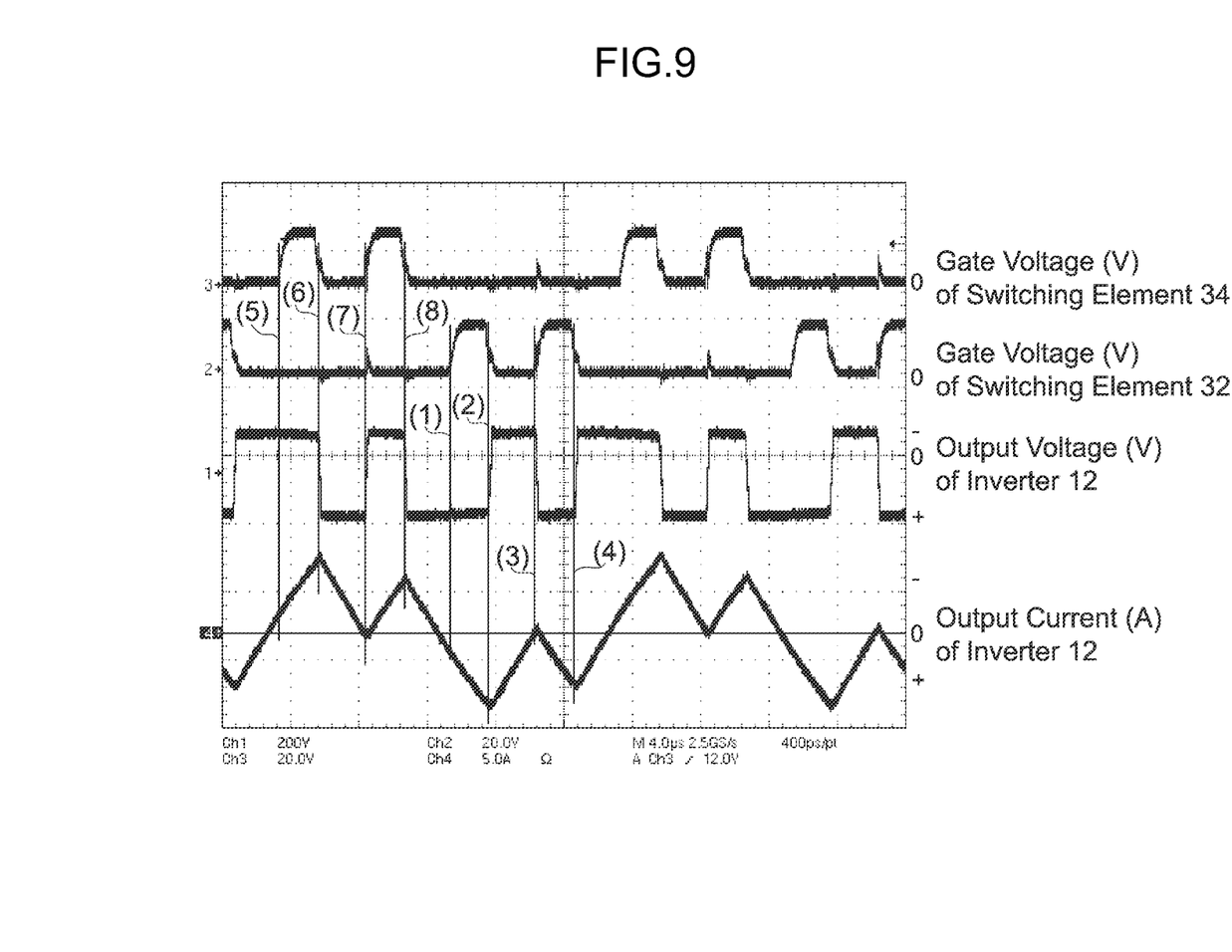
FIG. 9 shows other waveform charts of the respective parts illustrating operating conditions in the above comparative example.

For comparison, an example of different operational timings at the start-up is shown FIG. 9 when the switching elements 31 to 34 are allowed to perform a switching operation in a pattern the same as that in the present embodiment. A switching period T used here is 2 μsec=50 kHz the same as that in the present embodiment. In FIG. 9, the periods T1 and T5 are the same in length and also the periods T3 and T7 are the same in length and all the periods are set at 2 μsec. Further, the periods T2 and T6 are the same in length and also the periods T4 and T8 are the same in length and all the periods are set at 3 μsec.

Figure 7:
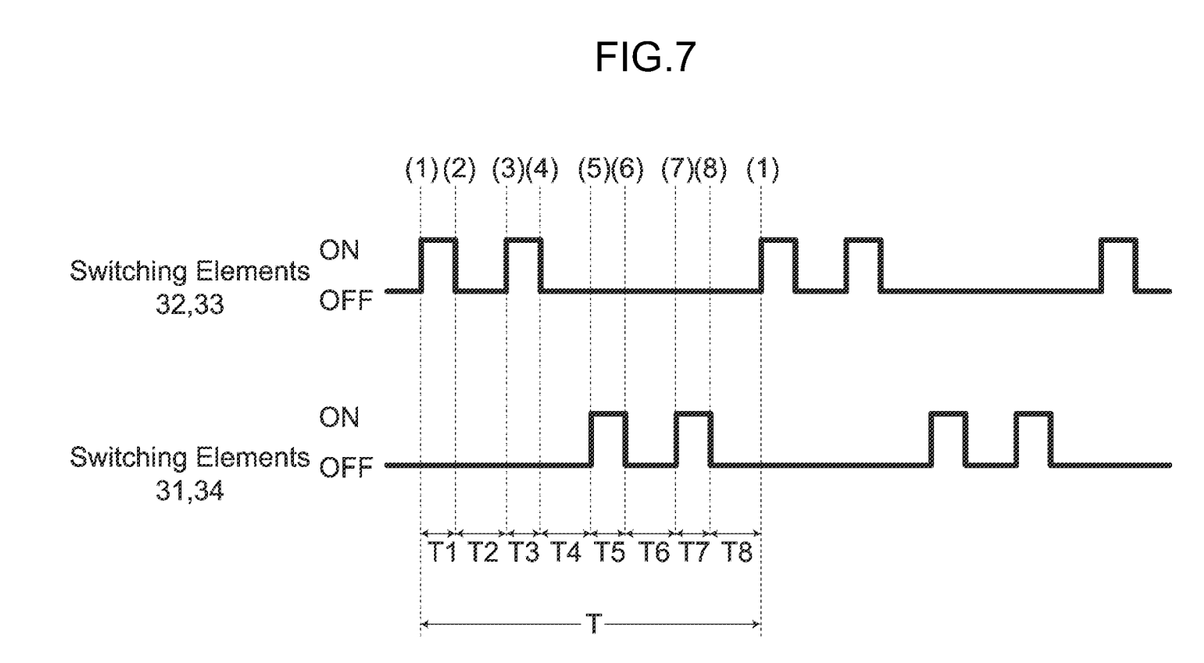
FIG. 7 shows timing charts illustrating another operating condition of each of the switching elements as a comparative example in the above embodiment.
Figure 8:
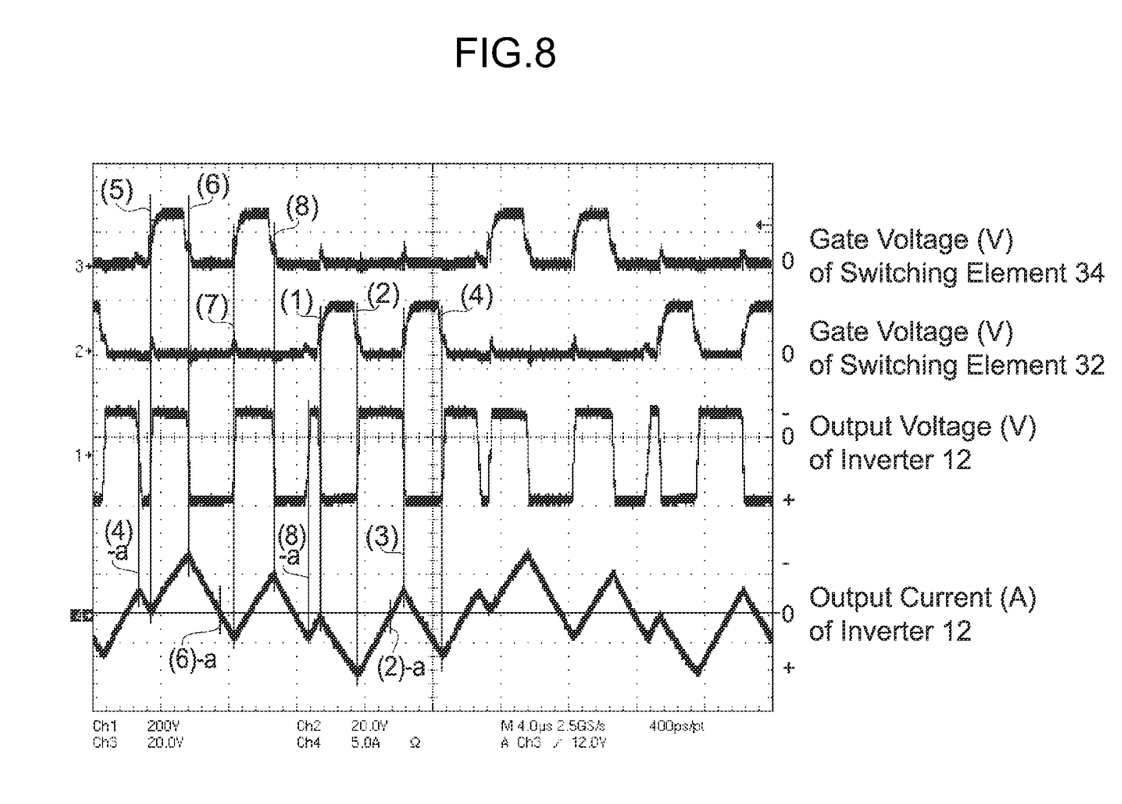
FIG. 8 shows waveform charts of the respective parts illustrating operating conditions in the above comparative example.

FIG. 8 and FIG. 9 show a waveform chart in each part when the switching elements 31 to 34 are allowed to perform switching operation with the timing shown in FIG. 7. In addition, in the comparative example here, the operational timings other than that of each of the switching elements 31 to 34 are common to those shown in the present embodiment.

FIG. 8 shows a waveform when the output current of the inverter 12 is 1.8 A, while FIG. 9 shows a waveform when the output current of the inverter 12 is 2.8 A. These FIGS. 8, 9 show a gate voltage of the switching element 34, a gate voltage of the switching element 32, the output voltage of the inverter 12 and the output current of the inverter 12 in the top-to-bottom sequence.

In FIG. 8, in the moment (4)-a, after the output voltage of the inverter 12 has been reversed from negative to positive in polarity, that is, subsequently to 180 degrees in the resonant frequency, an operation at the moment (5) is performed. At this time, no current is flowing through the diodes 31a, 34a built in the switching elements 31, 34 and the parasitic capacity between drain and source is charged. Accordingly, when the switching elements 31, 34 turn on, the diodes 31a, 34a built in the switching elements 32, 33 are drastically varied in voltage for a recovery current to flow, causing the internal loss. After the output voltage of the inverter 12 has been reversed from positive to negative in polarity at the moment (8)-a, such a loss is also generated when the operation at the moment (1) is performed.

Further, the switching elements 31, 34 turn on again at the moment (7) before the moment (6)-a, that is, before 180 degrees in the resonant frequency in the present embodiment. At this time, a current is flowing through the diodes 32a, 33a in the switching elements 32, 33. Hence, when the switching elements 31, 34 turn on, also a recovery current flows to generate the internal loss. At the moment (3), such a loss is also generated when the switching elements 32, 33 turn on again before the moment (2)-b in the present embodiment.

At the same time, in FIG. 9 at the moment (7), the switching elements 31, 34 turn on again before the moment (6)-b, that is, before 180 degrees in the resonant frequency in the present embodiment, causing the internal loss to be generated. Such loss is also generated at the moment (3), the switching elements 32, 33 turn on again before the moment (2)-b in the present embodiment.

A difference between waveforms in FIG. 8 and FIG. 9 depends upon the timings at which the switching elements 31 to 34 for reversing the polarity of the output voltage of the inverter 12 turn on. When the output current of the inverter 12 gets smaller and the output voltage to the load 40 gets larger by means of constant power control performed by the down chopper 11, a gradient when the output current of the inverter 12 decreases gets large, resulting in a relative delay of turning-on timing of the switching elements 31 to 34. Therefore, in the mode shown in FIG. 8, because an inflection point increases, the output current of the inverter 12 gets smaller. In order to increase the output current of the inverter 12, the timings T1, T3, T5, T7, that are the on-states of the switching elements 31 to 34, may be increased. A gradient of current is, however, unambiguously determined by the inductance value of the inductor 37, leading to the limitation of lengthening the above times.

The present invention is not limited to the embodiment described above and various modifications are possible within the gist of the scope of the present invention. The inductor 37 connected with the output of the inverter 12 is not limited to the inductance component of the trigger transformer and further the capacitor 38 is not limited to the capacitor for noise canceling at the time of the generation of a trigger high voltage. Further, the setting of the timings T1 to T8 shown in the embodiment is just one example.

What is claimed is:

1. A discharge lamp lighting device comprising:
   a DC power circuit for regulating an input voltage matching a tube voltage of a discharge lamp;
   an inverter for converting a DC output from said DC power circuit into an AC power to supply a current to said discharge lamp;
   a control circuit for controlling said DC power circuit and said inverter; and
   an inductor connected with an output of said inverter to apply a high-voltage pulse across electrodes of said discharge lamp at the start-up of said discharge lamp,
   wherein said inverter comprises: a first set of switching elements for switching an output voltage of said inverter to a voltage with one polarity; and a second set of switching elements for switching said output voltage to a voltage with the other polarity,
   wherein each of said switching elements is allowed to perform switching operations at the start-up of said discharge lamp in such a pattern that after turning on and off said first set of switching elements more than once, said second set of switching elements is allowed to turn on and off more than once,
   wherein a timing to turn on one set of said switching elements other than the other set of said switching elements turned on last is set in a range of 0 to 180 degrees in a period of a resonant frequency determined by a component of said inductor connected with the output of said inverter, a component determined by capacitances of a diode included in each of said switching elements and its peripheral circuit and an input voltage of said inverter, with a time at which all of said switching elements begin to turn off last defined as 0 degree, and wherein a timing to turn on again the set of said switching elements equal to the other set of said switching elements turned on last is set in a range of 180 to 360 degrees in the period of said resonant frequency, with a time at which all of said switching elements begin to turn off last defined as 0 degree.

2. The discharge lamp lighting device according to claim 1, wherein said timing to turn on said one set of said switching elements other than the other set of said switching elements turned on last as well as said timing to turn on again the other set of said switching elements equal to the other set of said switching elements turned on last are set based on said resonant frequency f calculated by the following formula 2:

$$f = \frac{1}{4}\sqrt{\frac{V}{2 \cdot Qrr \cdot L}}$$ (Formula 2)

where an inductance of said inductor is defined as L, a reverse recovery electric charge amount serving as said component determined by capacitances of the diode included in each of said switching elements and its peripheral circuit is defined as Qrr, and the input voltage of said inverter is defined as V.

3. The discharge lamp lighting device according to claim 1, wherein said timing to turn on said one set of said switching elements other than the other set of said switching elements turned on last is set in a range of 90±20 degrees in the period of said resonant frequency.

4. The discharge lamp lighting device according to claim 1, wherein said timing to turn on again the other set of said switching elements equal to the other set of said switching elements turned on last is set in a range of 270±20 degrees in the period of said resonant frequency.

5. The discharge lamp lighting device according to claim 1, wherein each of said switching elements is a MOSFET and said diode is a body diode of said MOSFET.

6. The discharge lamp lighting device according to claim 1, wherein said control circuit allows each of said switching elements to operate in a recurring pattern such that there arise in series a first moment at which said first set of switching elements turns on, a second moment at which all of said switching elements turn off, a third moment at which said first set of switching elements turns on again, a fourth moment at which all of said switching elements turn off, a fifth moment at which said second set of switching elements turns on, a sixth moment at which all of said switching elements turn off, a seventh moment at which said second set of switching elements turns on again, and an eighth moment at which all of said switching elements turn off.

7. The discharge lamp lighting device according to claim 6, wherein a period from said first moment to said second moment and a period from said fifth moment to said sixth moment are set to have the same length, a period from said second moment to said third moment and a period from said sixth moment to said seventh moment are set to have the same length, a period from said third moment to said fourth moment and a period from said seventh moment to said eighth moment are set to have the same length, and a period from said fourth moment to said fifth moment and a period from said eighth moment to said first moment are set to have the same length.

8. The discharge lamp lighting device according to claim 7, wherein the period from said first moment to said second moment is set longer than the period from said third moment to said fourth moment, while the period from said second moment to said third moment is set longer than the period from said fourth moment to said fifth moment.

9. The discharge lamp lighting device according to claim 8, wherein the period from said first moment to said second moment is set shorter than the period from said second moment to said third moment, while the period from said third moment to said fourth moment is set longer than the period from said fourth moment to said fifth moment.

10. The discharge lamp lighting device according to claim 6, wherein said control circuit can variably set the period from said first moment to said second moment, the period from said second moment to said third moment, the period from said third moment to said fourth moment, the period from said fourth moment to said fifth moment, the period from said fifth moment to said sixth moment, the period from said sixth moment to said seventh moment, the period from said seventh moment to said eighth moment, and the period from said eighth moment to said first moment.

* * * * *